(12) United States Patent
Evans et al.

(10) Patent No.: US 8,171,868 B2
(45) Date of Patent: May 8, 2012

(54) SEWING METHOD FOR SEAT COVER

(75) Inventors: Nancy C. Evans, Clinton Township, MI (US); Scott D. Thomas, Novi, MI (US); William A. Biondo, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 348 days.

(21) Appl. No.: 12/647,472

(22) Filed: Dec. 26, 2009

(65) Prior Publication Data

US 2010/0251950 A1 Oct. 7, 2010

Related U.S. Application Data

(63) Continuation-in-part of application No. 12/416,977, filed on Apr. 2, 2009, now Pat. No. 7,690,723.

(51) Int. Cl.
*D05B 13/00* (2006.01)
*B60R 21/20* (2011.01)
*D05B 33/00* (2006.01)
*B60N 2/42* (2006.01)

(52) U.S. Cl. ............... 112/475.08; 280/728.3; 297/216.1

(58) Field of Classification Search ............ 112/475.01, 112/475.08, 475.17, 475.24; 280/728.1–728.3, 280/743.1, 730.2; 297/216.1, 216.13
See application file for complete search history.

(56) References Cited

U.S. PATENT DOCUMENTS

| | | | | |
|---|---|---|---|---|
| 5,556,129 A * | 9/1996 | Coman et al. | | 280/730.2 |
| 5,676,394 A * | 10/1997 | Maly | | 280/728.3 |
| 5,810,389 A * | 9/1998 | Yamaji et al. | | 280/730.2 |
| 5,882,033 A * | 3/1999 | Lachat | | 280/728.3 |
| 6,074,003 A * | 6/2000 | Umezawa et al. | | 297/216.1 |
| 6,254,122 B1 * | 7/2001 | Wu et al. | | 280/730.2 |
| 6,402,189 B1 * | 6/2002 | Gray et al. | | 280/728.3 |
| 2007/0013172 A1 * | 1/2007 | Haba et al. | | 280/728.3 |
| 2008/0284143 A1 * | 11/2008 | Smith et al. | | 280/730.2 |
| 2010/0147129 A1 * | 6/2010 | Kalisz et al. | | 83/880 |

* cited by examiner

*Primary Examiner* — Ismael Izaguirre

(57) ABSTRACT

A method is provided for sewing a seat cover to provide a side panel and an inset panel with a C-shaped separable seam and inner and outer chutes for air bag deployment. The method comprises sewing the side panel and the inner chute together with permanent vertical extending and upper and lower horizontal extending seams that will not break during air bag deployment, and sewing the inset panel and the outer chute together with permanent vertical extending seams and upper and lower horizontal extending seams that will not break during air bag deployment. And thereafter sewing the side panel and the inset panel together with separable vertical extending seams and upper and lower horizontal extending seams that will break upon the air bag deployment to allow inflation of the air bag while the inner chute remains attached to the front panel and the outer chute remains attached to the side panel to guide the inflating air bag.

20 Claims, 12 Drawing Sheets

SEWING METHOD FOR SEAT COVER

This application is a continuation-in-part of U.S. patent application Ser. No. 12/416,977 filed Apr. 2, 2009.

FIELD OF THE INVENTION

The present invention relates to a vehicle seat having a side impact air bag and more particularly a method for sewing the seat cover to form a continuous C-shaped separable seam and air bag deployment chute.

BACKGROUND OF THE INVENTION

It is well known in the automotive industry to provide a vehicle seat having an air bag mounted on the outboard side of the seat back to provide side impact restraint of a seated occupant. The air bag may include a thorax portion that inflates forwardly of the occupant torso, a head portion that inflates more upwardly and forwardly to restrain the occupant head, and a pelvis portion that inflates more downwardly and forwardly to restrain the occupant pelvis. The air bag is folded up and stored within an air bag housing that is mounted on the seat back. In some cases a plastic door conceals the folded up air bag and then the door opens to permit the deployment of the air bag forwardly and downwardly. However, it is generally considered to be more aesthetically acceptable to hide the air bag assembly within the seat back beneath the traditional seat cover and to provide the seat trim cover with separable seams that can break apart to permit the air bag to deploy forwardly and downwardly.

It would be desirable to provide an improved method for sewing the seat cover to form a continuous C-shaped separable seam and air bag deployment chute.

SUMMARY OF THE INVENTION

A method is provided for sewing a seat cover to provide a side panel with a C-shaped separable seam, an inset panel and inner and outer chutes for air bag deployment. The method comprises sewing the side panel and the inner chute together with permanent vertical and upper and lower horizontal extending seams that will not break during air bag deployment, and sewing the inset panel and the outer chute together with permanent vertical and upper and lower horizontal extending seams that will not break during air bag deployment. And thereafter sewing the side panel and the inset panel together with separable vertical and upper and lower horizontal extending seams that will break upon the air bag deployment to allow inflation of the air bag while the inner chute remains attached to the side panel and the outer chute remains attached to the inset panel to guide the deployment of the inflating air bag.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

Figure 1:
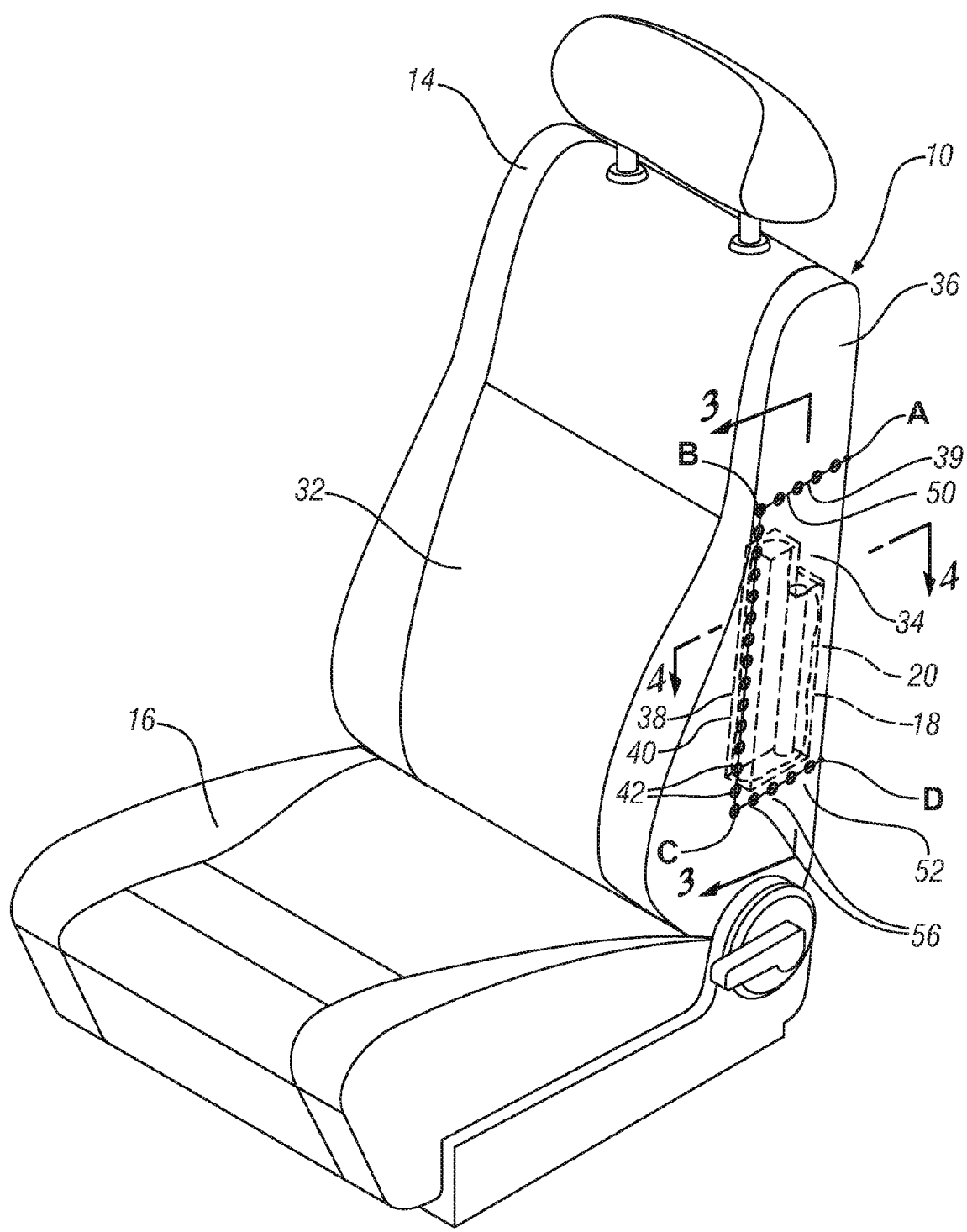
FIG. 1 is a perspective view of a vehicle seat having a side air bag.
Figure 2:
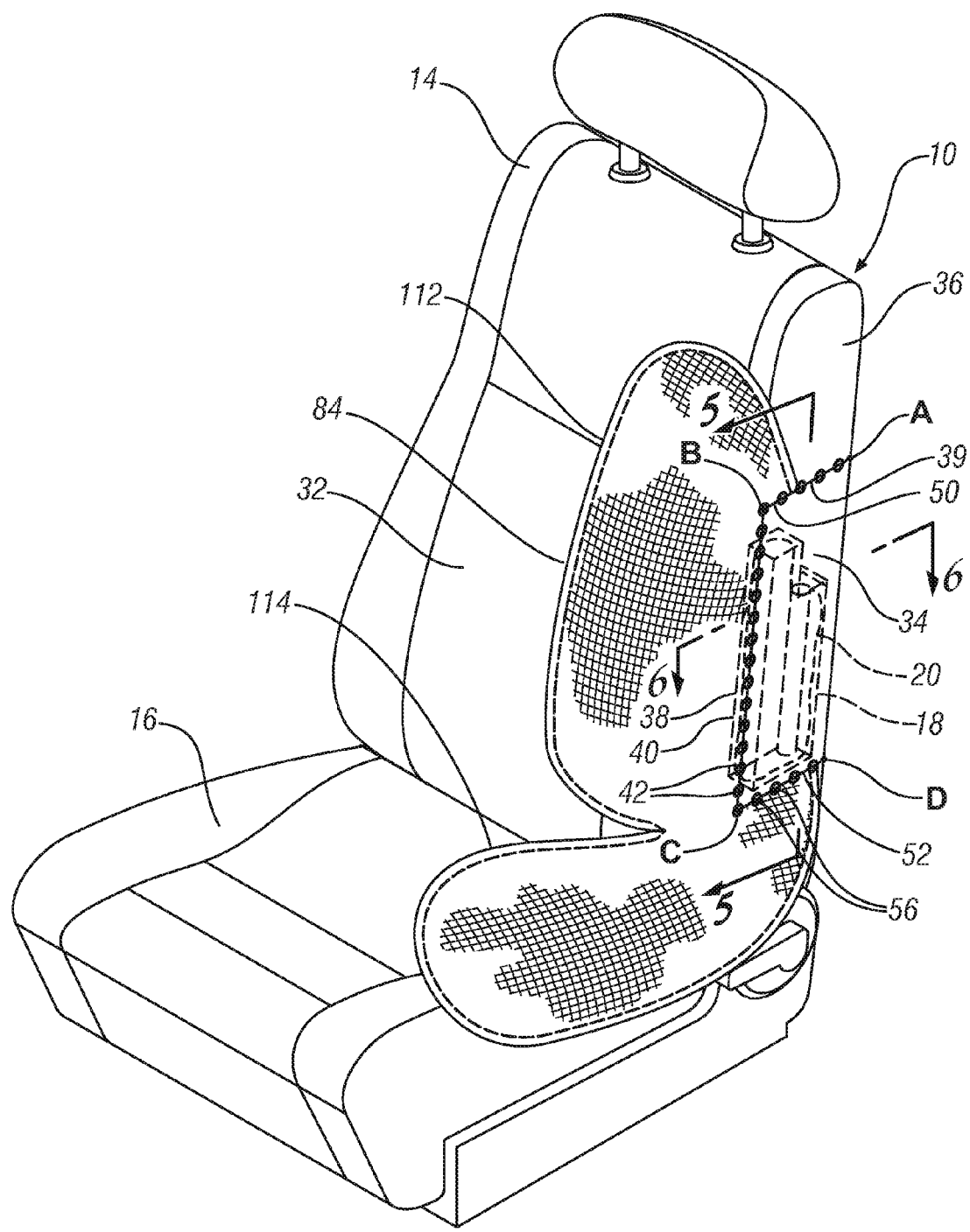
FIG. 2 is a view similar to FIG. 1 but showing the air bag to have been inflated and deployed as permitted by separation of a continuous separable seam of the seat trim cover.
Figure 3:
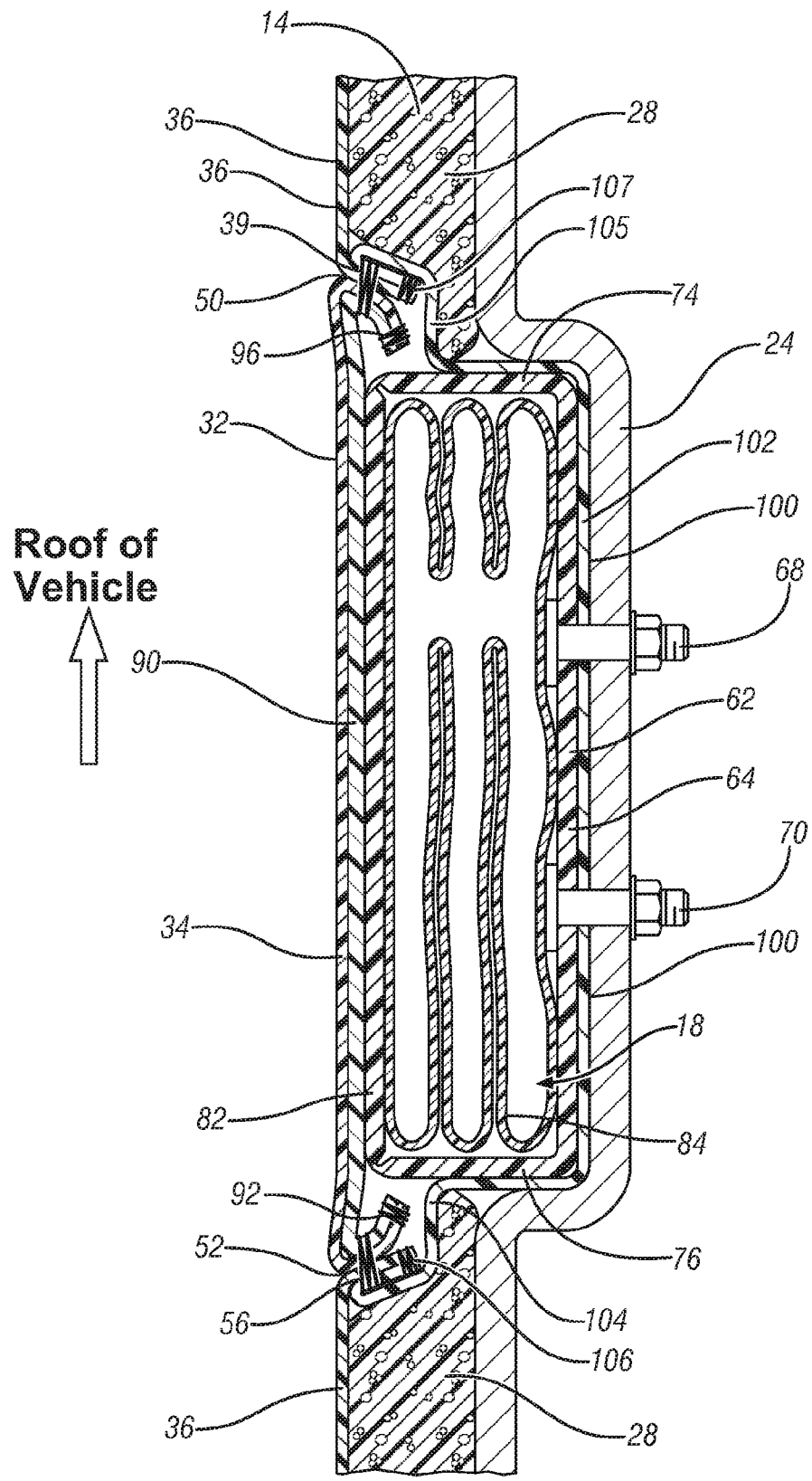
FIG. 3 is a section view taken in the direction of arrows 3-3 of FIG. 1.
Figure 4:
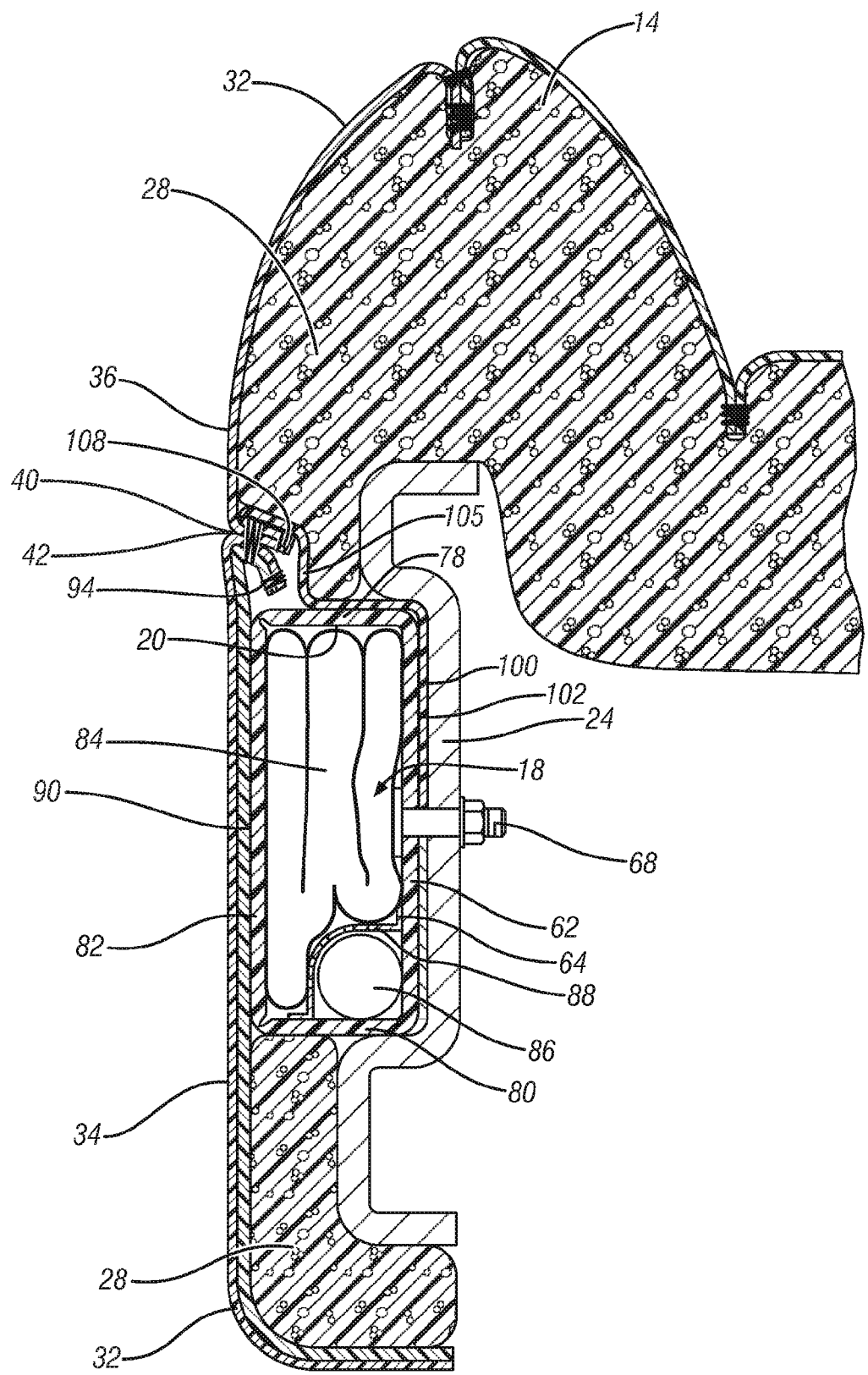
FIG. 4 is a section view taken in the direction of arrows 4-4 of FIG. 1.

The following description of certain exemplary embodiments is merely exemplary in nature and is not intended to limit the invention, its application, or uses. Referring to FIGS. 1 and 2, a vehicle seat generally indicated at 10 includes a seat back 14 and a seat bottom 16. An air bag assembly, generally indicated at 18, is mounted within a hollow 20 in the seat back 14. As seen in FIGS. 3 and 4, the seat back 14 includes a seat frame 24 of stamped metal construction. A foam seat cushion 28 covers the frame 24 and is suitably attached thereto. The foam cushion 28 is concealed beneath a seat cover 32, such as a woven cloth, vinyl, or leather.

As best seen in FIGS. 1 and 4, the seat cover 32 includes an inset panel 34 and a side panel 36. The side panel 36 includes a rectangular cutout or open area to receive the inset panel 34. As best seen in FIGS. 1, 3 and 4, the inset panel 34 and the side panel 36 are joined together by a separable seam 38, comprised of an upper horizontal extending section 39, formed by a series of breakaway stitches 50, a vertical extending section 40, formed by a series of breakaway stitches 42, and a lower horizontal extending section 52, formed by a series of breakaway stitches 56, between the inset panel 34 and the side panel 36. Referring again to FIG. 1, it is seen that the separable seam 38 is formed continuously from the break away stitches 50 forming the upper horizontal extending tear seam section 39 beginning at point "A", the break away stitches 42 forming the vertical extending tear seam section 40 beginning at point "B" and the break away stitches 56 forming the lower horizontal extending tear seam section 52 beginning at the point designated "C". Also, the break away stitches 56 forming the horizontal extending tear seam 52 have a rear end at point "D". Thus, as seen in FIG. 1, the overall shape of the separable seam 38 formed of seam sections 39, 40 and 52 is a C-shaped tear seam arrangement A to B to C to D adjacent the air bag assembly 18 on the outboard side of the seat back 14. Upon inflation of the air bag, the separable C-shaped tear seam arrangement will be overcome as will be described hereinafter to allow the inflating air bag 84 to deploy from the seat 10 as seen in FIG. 2.

Referring to FIGS. 3 and 4, it is seen that the air bag assembly 18 includes an air bag housing 62 having a base wall 64 that is attached to the seat frame 24 by bolts 68 and 70. The housing 62 has side walls including upper side wall 74, lower side wall 76, front side wall 78 and rear side wall 80. The side walls 74, 76, 78 and 80 are connected by a hinged cover 82 that conceals a folded up air bag 84 and an inflator 86. The air bag housing is conventionally constructed of plastic or fabric or a combination of plastic and fabric. In addition, the air bag housing can also partially consist of an inflator mounting bracket in numerous configurations. An example of a mounting bracket 88 is shown in FIG. 4.

Referring to FIG. 3, it is seen that the inset panel 34 of the seat cover is lined with an outer chute 90 that has an upper end sewn to the upper end of the inset panel 34 adjacent to the separable seam section 39 by stitches at 96 and a lower end sewn to the lower end of the inset panel 34 adjacent to the separable seam section 52 by stitches at 92. And, as seen in FIG. 4, the outer chute 90 also has a forward end which is sewn to the forward end of the inset panel 34 adjacent to the separable seam section 40 by stitches 94. The outer chute 90 is of a material that is less stretchable than the trim cover 32 material of the inset panel 34 and has a smooth surface finish to allow the low friction passage of the air bag 84 there against.

Figure 7:
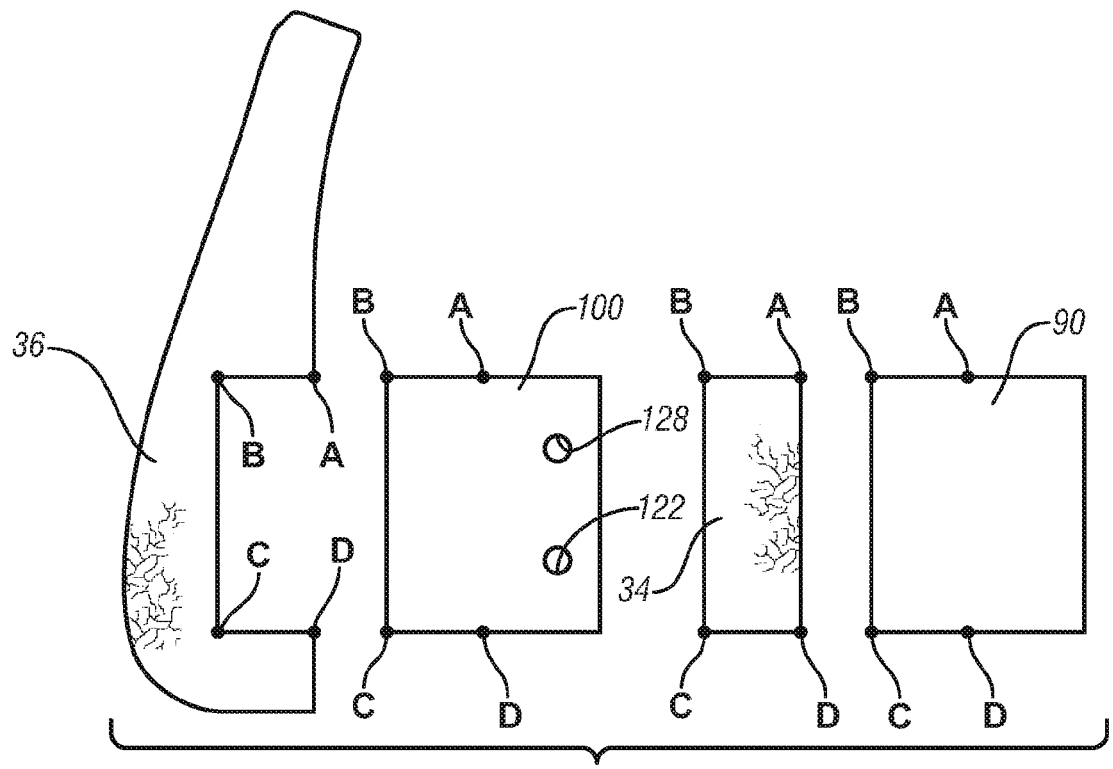
FIG. 7 is a plan view showing the pieces of material that will be sewn together to make the seat side panel, inset panel, and the inner and outer chutes.

FIGS. 3 and 4 also show an inner chute 100 that has a base portion 102 that is captured between the base wall 64 of the air bag housing 62 and the seat frame 24. As seen in FIG. 7, the base portion 102 of the inner chute 100 has two holes 128 and 122 which fit over the mounting studs 68 and 70 to fixedly anchor the inner chute 100. As seen in FIG. 3, the inner chute 100 includes a lower edge portion 104 that extends downwardly and is sewn to the lower portion of the side panel 36 adjacent to the separable seam section 52 by stitches at 106 and an upper edge portion 105 that extends upwardly and is sewn to the upper portion of the side panel 36 adjacent to the separable seam section 39 by stitches at 107. FIG. 4 shows that the inner chute 100 extends forwardly between the foam cushion 28 and the air bag housing 62 all the way forward to the separable seam section 40 where the forwardmost end 105 of the inner chute 100 is sewn to the side panel 36 of the seat cover adjacent to the separable seam section 40 by stitches 108. The inner chute 100 is made of a material that is less stretchable than the trim cover 32 material of the front panel 36 and offers a smooth low friction surface to allow the low friction passage of the air bag 84 against the foam cushion 28.

Figure 5:
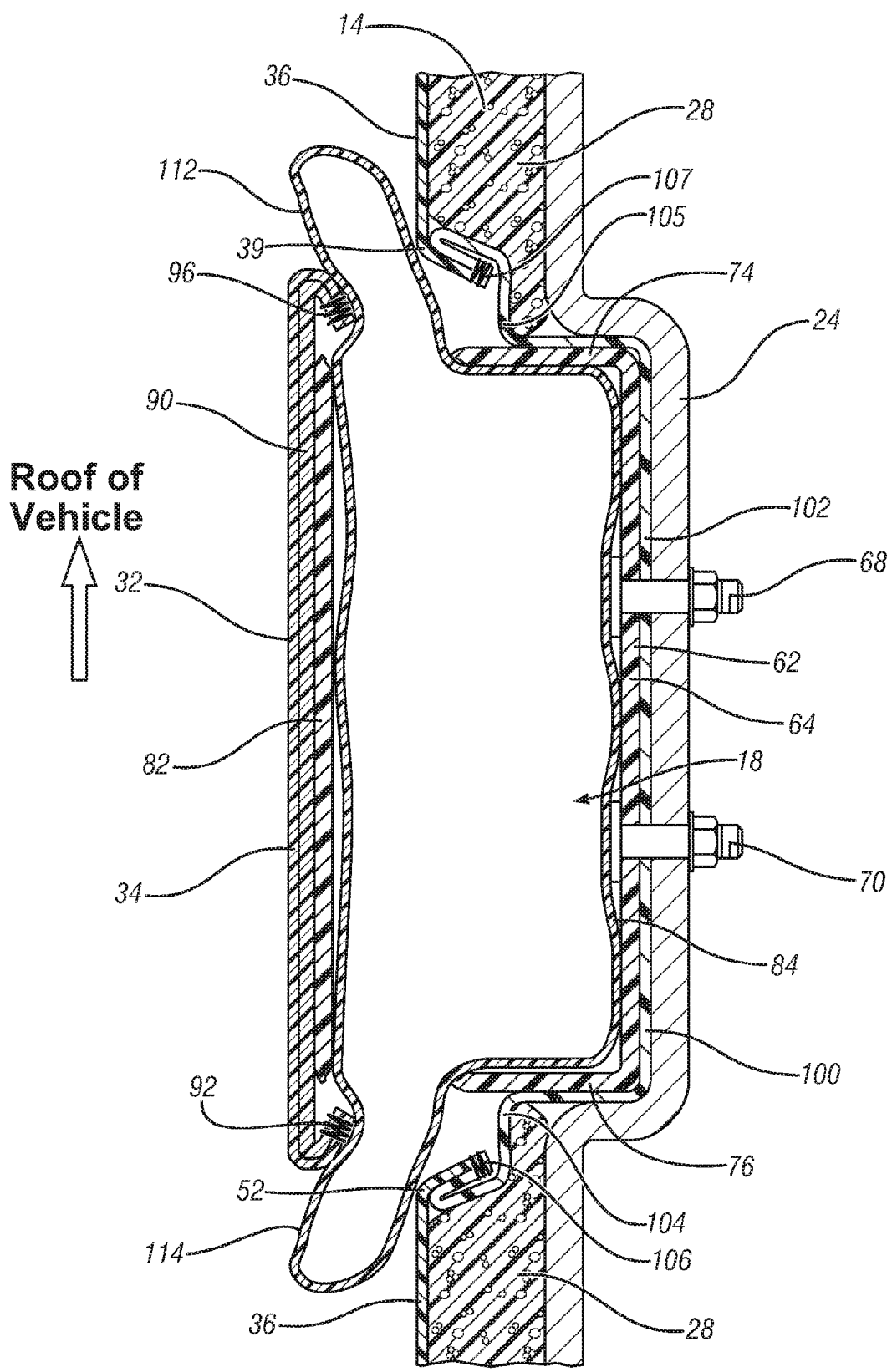
FIG. 5 is a view similar to FIG. 3 but showing the air bag being inflated and causing a separation of the upper and lower horizontal extending separable seam sections.
Figure 6:
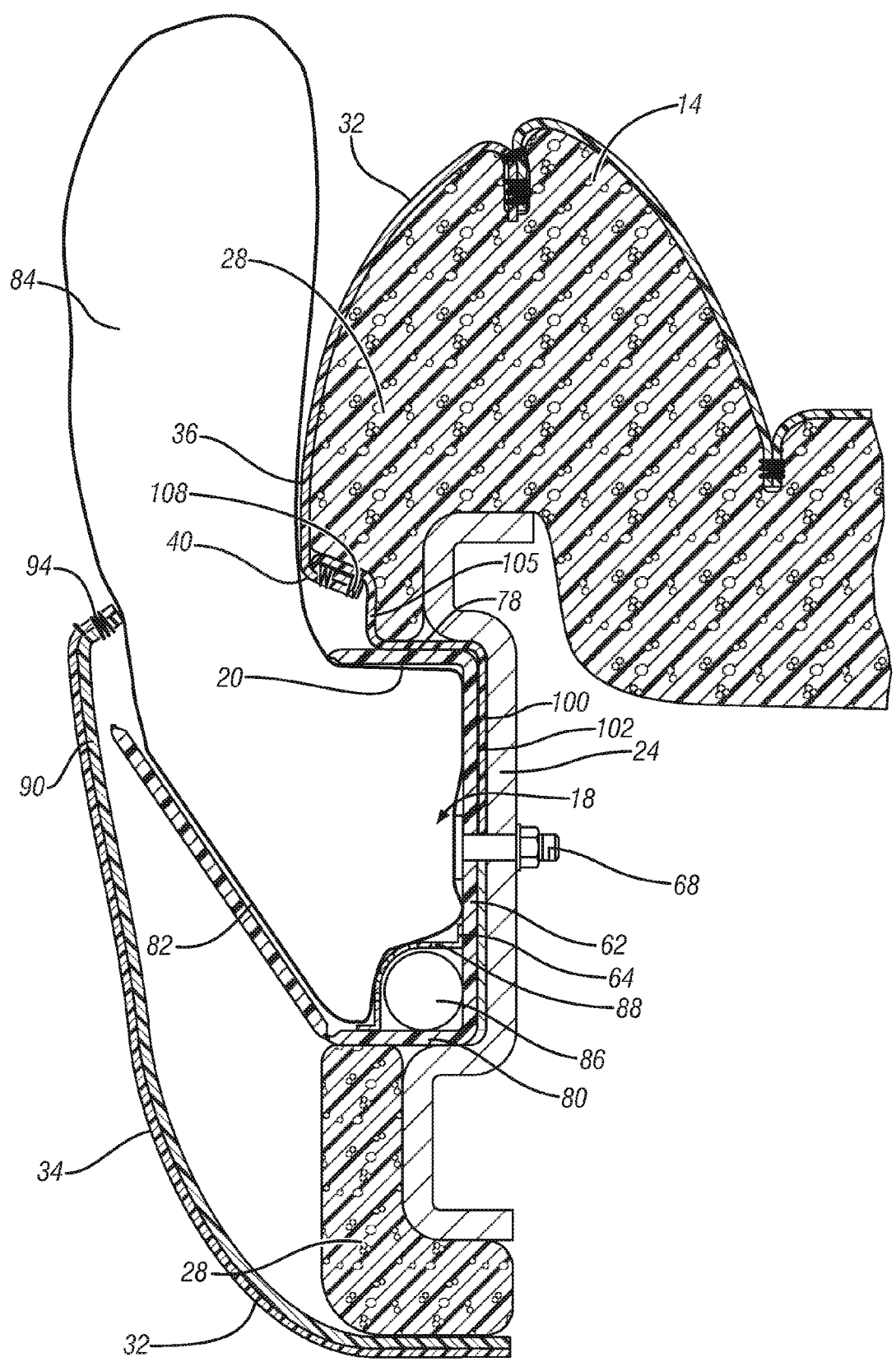
FIG. 6 is a section view similar to FIG. 4 but showing the air bag being inflated and causing separation of the vertical extending separable seam section.

FIGS. 2, 5 and 6 show the inflation of the air bag assembly 18. In particular, FIG. 2 shows that the air bag 84 includes an upper thorax portion 112 and a lower pelvis portion 114. In FIG. 5, it is seen that upon activation of the inflator 86, the air bag 84, including both its upper thorax portion 112 and the lower pelvis portion 114, have begun to inflate outwardly of the air bag housing 62 as permitted by hinging of the hinged cover 82. As seen in FIG. 5, the upper horizontally extending separable seam section 39 at the upper edge of the air bag housing 62 has been separated, by the breaking of the stitches 50 to permit the emergence of the upper thorax portion 112, and the lower horizontally extending separable seam section 52 at the lower edge of the air bag housing 62 has been separated, by the breaking of the stitches 56 to permit the emergence of the lower pelvis portion 114, and, as shown in FIG. 6, the emergence of the upper thorax portion 112 has likewise caused the opening of the vertical extending separable seam section 40 via the breaking of the breakaway stitches 42 at the juncture between the inset panel 34 and the side panel 36. It will be understood that during the inflation of the air bag 84, the inner chute 100 will function to prevent stretching of the side panel 36 so that the force of the air bag 84 acting upon the outer chute 90 will be transmitted effectively to the break away stitches 42, 50 and 56. Likewise, the inner chute 100 will function in a similar manner to effectively anchor and restrain both the inset panel 34, and the side panel 36 so that the force generated by the inflating air bag 84 is effectively focused at the break away stitches 42, 50 and 56. Thus as seen in FIG. 2, the vertical extending separable seam section 40 and the upper and lower horizontal extending separable seam sections 39 and 52, will enable the inflating air bag to efficiently break out of its stored and hidden position of FIG. 1 to expedite its arrival at the fully inflated occupant restraining positions of FIG. 2.

FIGS. 7-15 show the steps of a method for sewing together the side panel 36, inner chute 100, inset panel 34, and outer chute 90. In FIGS. 7-15 the following conventions used and will assist the reader in understanding the drawings:

a. the side panel and the inset panel are always shown in their eventual car position corresponding to FIG. 1, rather than attempting to show the rotation of the panels and chute pieces that will be executed by a skilled sewing machine operator in order to move the pieces through the sewing machine for sewing of the seams.

b. the reference letter A will be used to indicate the rearward end of the upper horizontal extending tear seam section, the letter B identifies what will become the intersection point of the upper horizontal and vertical extending tear seam sections, the letter C identifies what will become the intersection point of the vertical and lower horizontal extending tear seam sections, and the letter D indicates the rearward end of the lower horizontal extending tear seam section.

c. although not shown in the drawings, a person of ordinary skill in the art knows that each of the piece of fabric to be sewn will have a seam allowance provided thereon to accommodate the placement of the rows of stitches. A seam allowance is the area between the edge and the stitching line of two or more pieces of material stitched together.

d. in the drawings, the symbol "x" is used to denote stitches that are permanent and will not normally tear. These stitches "x" are sewn using a thread that has sufficient strength and a stitches-per-inch count that will assure that these stitches will not break during normal use of the vehicle seat or during the deployment of the airbag. The symbol "o" is used to denote stitches that are designed to break away in response to the forces imposed by the inflating air bag. Thus these stitches "o" are made using a thread strength and stitches-per-inch count such that the stitches will hold during normal use of the seat, but break away in response to force applied by the inflating air bag.

e. the show surface of the inset panel 34 and the side panel 36 is designated by wavy lines to indicate the graining that is common on the surface of vinyl pieces, and the back surface of the panels 34 and 36 are designated by a patch of diagonal crosshatching as often a sheet of reinforcing fabric is bonded to the back side of the vinyl surface.

f. for ease of illustration, the inset panel 34, side panel 36, inner chute 100, and outer chute 90 are shown as simple geometric representations, not as pieces with complex curved surfaces with matching lengths as would be expected on an actual seat cover.

Referring to FIG. 7 it is seen that the side panel 36 is a piece of seat covering vinyl, but may be cloth or leather material. The inner chute 100 is a rectangular piece of the chute material and has holes 122 and 128 therein which will receive the mounting studs of the airbag inflator. The inset panel 34 is a generally rectangular piece of seat covering vinyl, but may be cloth or leather. The side panel 36 has a generally rectangular opening at the rearward edge to accommodate the inset panel 34. In FIG. 7, the reference letter A will be used to indicate the rearward end of the upper horizontal extending tear seam section, the letter B identifies what will become the intersection point of the upper horizontal and vertical extending tear seam sections, the letter C identifies what will become the intersection point of the vertical and lower horizontal extending tear seam sections, and the letter D indicates the rearward end of the lower horizontal extending tear seam section.

Figure 8:
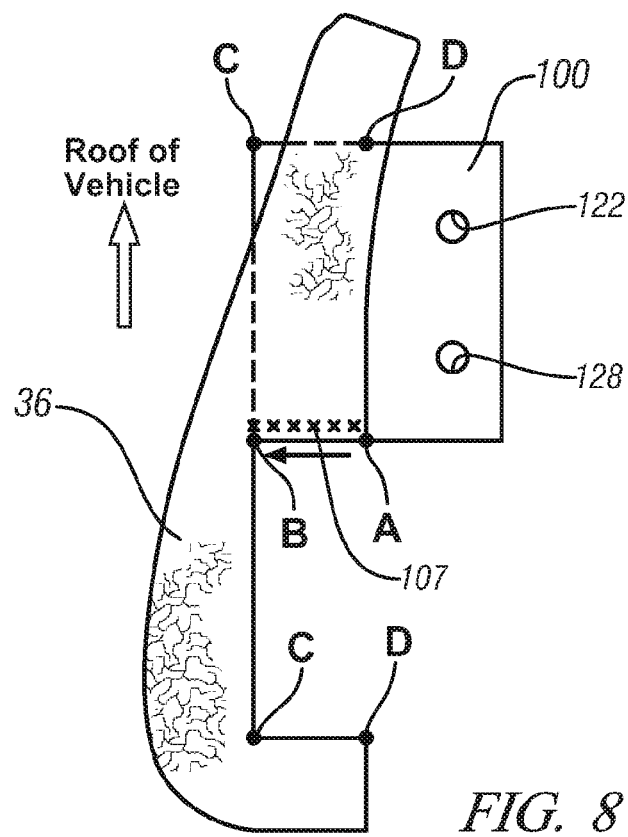
FIG. 8 shows the first step in sewing the side panel to the inner chute.
Figure 9:
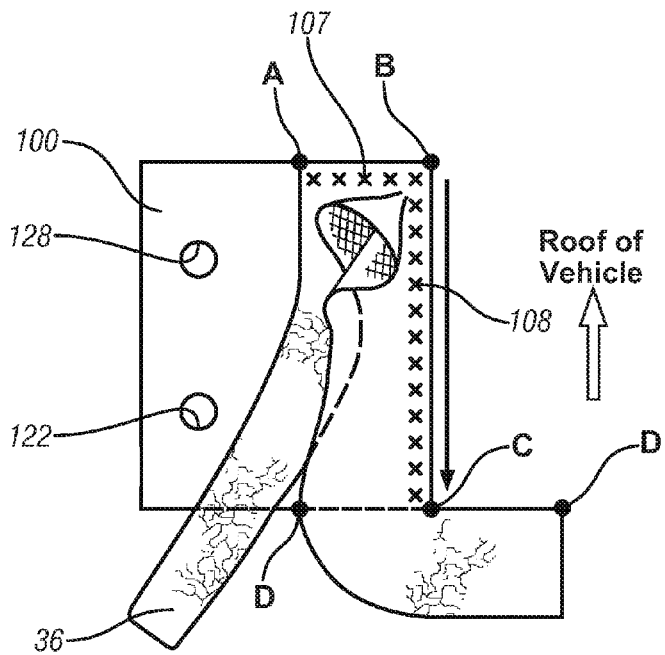
FIG. 9 shows the second step in sewing the side panel to the inner chute.
Figure 10:
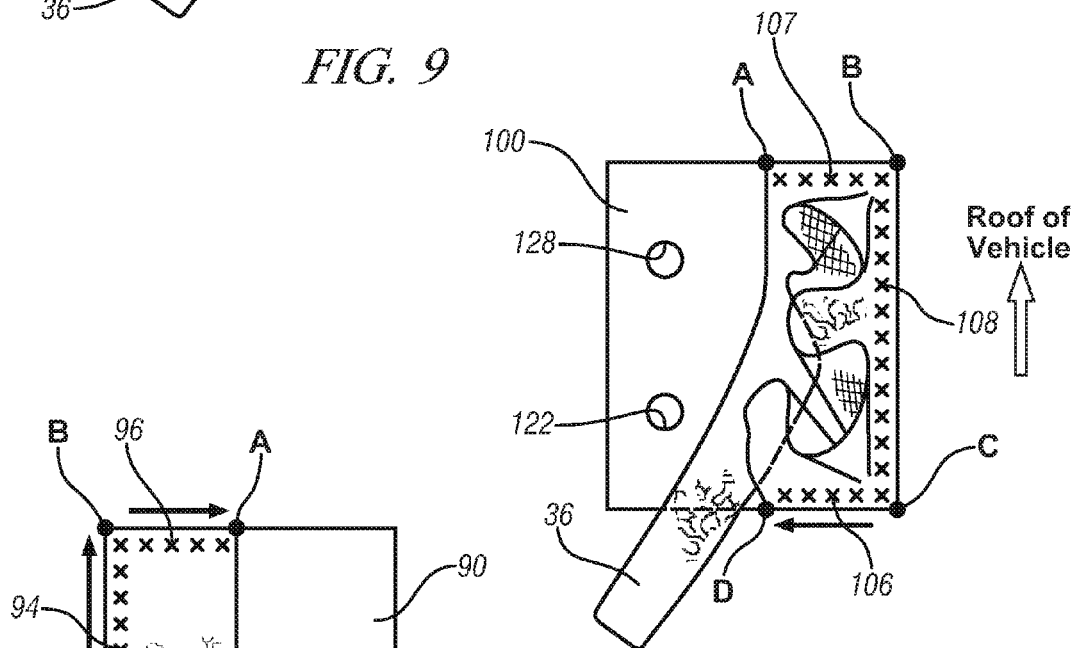
FIG. 10 shows the third and final step in sewing the side panel to the inner chute.

FIGS. 8-10 show the first step in the sewing of the side panel 36 to the inner chute 100. Referring to FIG. 8 it is seen that the inner chute 100 has been turned over from its position in FIG. 7, and placed under the side panel 36 to align the edges A-B on both the inner chute 100 and the side panel 36. The side panel 36 and the inner chute 100 are sewn together from A to B by horizontal stitches 107, denoted by the row of x's. Although not shown in the drawings, a person of ordinary skill in the art knows that both of the side panel 36 and the inner chute 100 will have a seam allowance provided thereon to accommodate the placement of the row of stitches 107. A seam allowance is the area between the edge and the stitching line of two or more pieces of material stitched together.

Proceeding to FIG. 9, the inner chute 100 and the upper portion of the side panel 36 have been rotated counterclockwise 180 degrees about point B. This causes the edge B-C on the inner chute 100 to align with the edge B-C of the side panel 36. Then a vertical row of stitches 108 is sewn from B to C, in the direction of the arrow as denoted by the row of x's.

Then, in FIG. 10 the lower portion of the side panel 36 has been lifted and rotated 180 degrees about point C to lie atop the inner chute 100, and a horizontal row of stitches 106 is sewn from C to D, denoted by the row of x's. The sewing needle is preferably left in the materials at points B and C as the materials are reoriented from the position of FIG. 8 to the position of FIG. 9 to the position of FIG. 10. In this way the seam from A to B to C to D will be of a continuous thread. However although more time consuming, the needle can be removed and the thread terminated upon reaching points B and C, and then the sewing can be restarted to sew from B to C and C to D. Also, it will be appreciated that the order of the sewing of the front panel 36 to the inner chute 100 can be reversed to sew from D to C to B to A, by performing the sewing of FIG. 10 prior to the sewing of FIGS. 9 and 8 in the reverse order and direction, with the two pieces flipped over so that the inner chute 100 is on top of the side panel 36.

Figure 11:
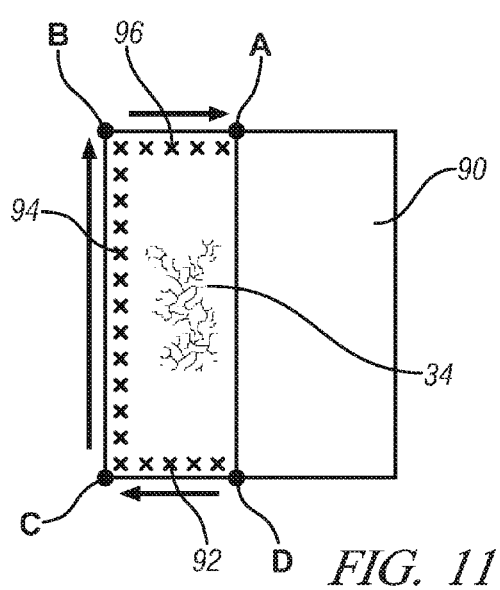
FIG. 11 shows the sewing of the inset panel to the outer chute.

FIG. 11 shows the sewing of the outer chute 90 to the inset panel 34. As seen in FIG. 11, inset panel 34 is laid atop the outer chute 90, and seams are sewn between the edges thereof, denoted by the rows of x's, including a horizontal row of stitches 92 proceeding from D to C, a vertical row of stitches 94 proceeding from C to B and a horizontal row of stitches 96 proceeding from B to A. Although not shown in the drawings, a person of ordinary skill in the art knows that both of the inset panel 34 and the outer chute 90 will have a seam allowance provided thereon to accommodate the placement of the rows of stitches 92, 94 and 96. A seam allowance is the area between the edge and the stitching line of two or more pieces of material stitched together.

Thus, to summarize, in FIGS. 8-10 the side panel 36 has been permanently sewn to the inner chute 100. And in FIG. 11, the inset panel 34 has been permanently sewn to the outer chute 90. Alternatively, rather than sewing these seams, these pieces could simply be held together as shown in FIG. 12, and the separable C-shaped seam 38 between the side panel 36 and the inset panel 34 is sewn as described below and shown in FIG. 12.

Figure 12:
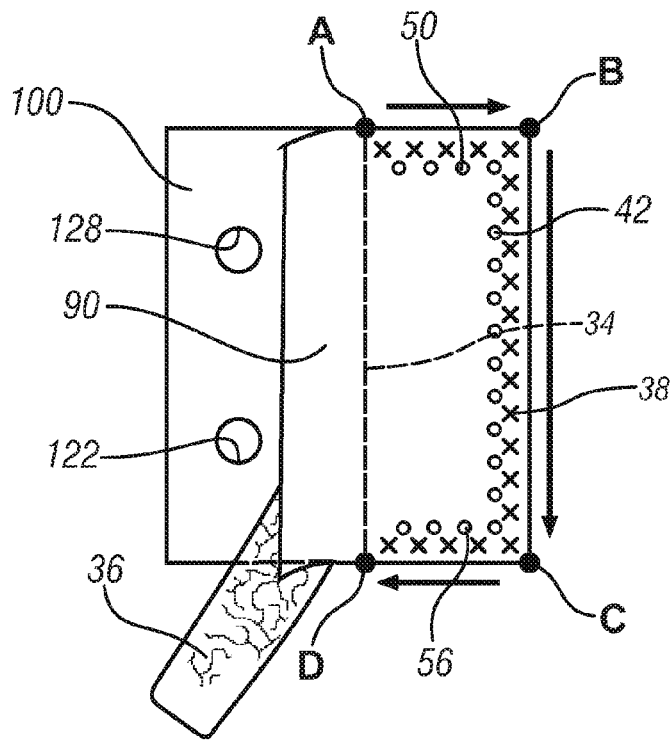
FIG. 12 shows the sewing of the C-shaped separable seam to join the two subassemblies.
Figure 13:
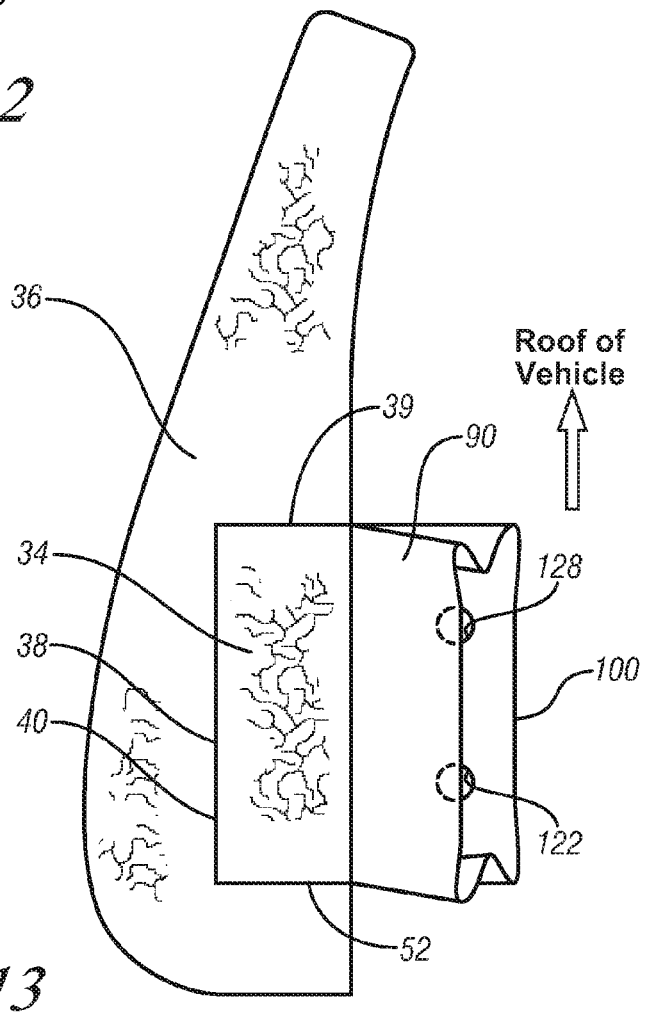
FIG. 13 shows the finished subassembly of the side panel, inset panel and inner and outer chutes ready for sewing into the seat cover.

FIG. 12 shows the sewing of the separable C-shaped seam 38 between the side panel 36 and the inset panel 34. As seen in FIG. 12, the inset panel 34 and the outer chute 90 have been turned over so the outer chute 90 is on top, and placed on top of the side panel 36 and inner chute 100, thus aligning the edges A-B, B-C, and C-D on both the side panel 36 and the inset panel 34. The separable C-shaped seam 38 between the side panel 36 and the inset panel 34 is made by sewing breakaway stitches, denoted by the rows of o's, around the edges, inboard of the locations of the previously sewn seams 92 from A to B, 94 from B to C and 96 from C to D. The breakaway stitches 50 from A to B form the upper horizontal extending separable seam section 39, the breakaway stitches 42 from B to C form the vertical extending separable seam section 40, and the breakaway stitches 56 from C to D form the lower horizontal extending seam section 52, as shown in FIG. 13. The sewing needle is left in the materials at points B and C so that the separable seam from A to B (39) to C (40) to D (52) will be of a continuous thread. It will be understood that, if desired, the order of the sewing operations could be modified to sew the lower horizontal row of stitches 56 prior to the sewing of the vertical row of stitches 42 and the upper horizontal row of stitches 39, sewing from D to C to B to A, by performing the sewing of FIG. 12 in the reverse direction.

FIG. 13 shows the inverted and completed assembly of the inset panel 34, side panel 36 together with the inner chute 100 and outer chute 90 to form the C-shaped separable seam 38 from A to B (39) to C (40) to D (52), and ready for assembly with the additional panels that will make up the finished seat cover 32 of FIG. 1.

Figure 14:
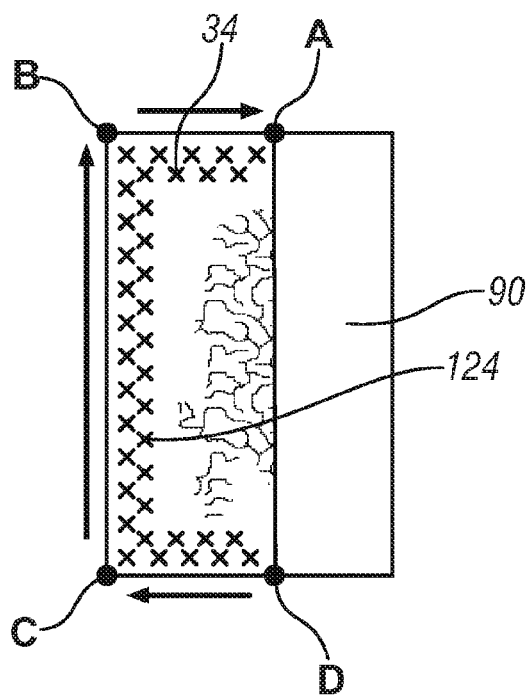
FIG. 14 shows optional French stitching on the inset panel, which is sewn after FIG. 11.

Optionally as shown in FIG. 14, French stitching 124 can be placed on the inset panel 34, denoted by the line of x's, after the seams shown in FIG. 11 have been sewn. The French stitching 124 is placed inboard of the location where the separable seam 38 will be sewn in FIG. 12.

Figure 15:
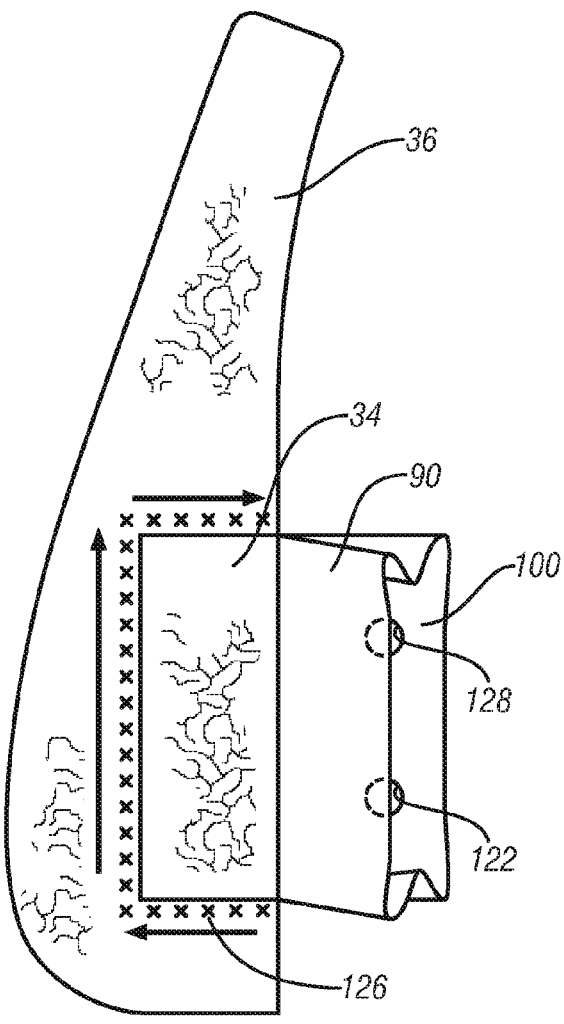
FIG. 15 shows optional French stitching on the side panel, which is sewn after FIG. 13.

Optionally as shown in FIG. 15, French stitching 126 can be placed on the side panel 36, denoted by the line of x's, after the assembly has been opened out as shown in FIG. 13. The French stitching 126 is placed outboard of the location where the separable seam 38 was sewn in FIG. 12.

It will also be understood that the invention is not limited to the particular attachment of the air bag chute to the air bag housing that is shown in the examples of the drawings herein. Rather the rearward ends of the air bag chutes can be anchored on the seat trim or on the seat structure or on the air bag housing. For example, U.S. patent application Ser. No. 12/335,726, filed 16 Dec. 2008, entitled Air Bag Chute Attachment shows several examples of air bag chute attachments that can be used in the present invention.

Figure 16:
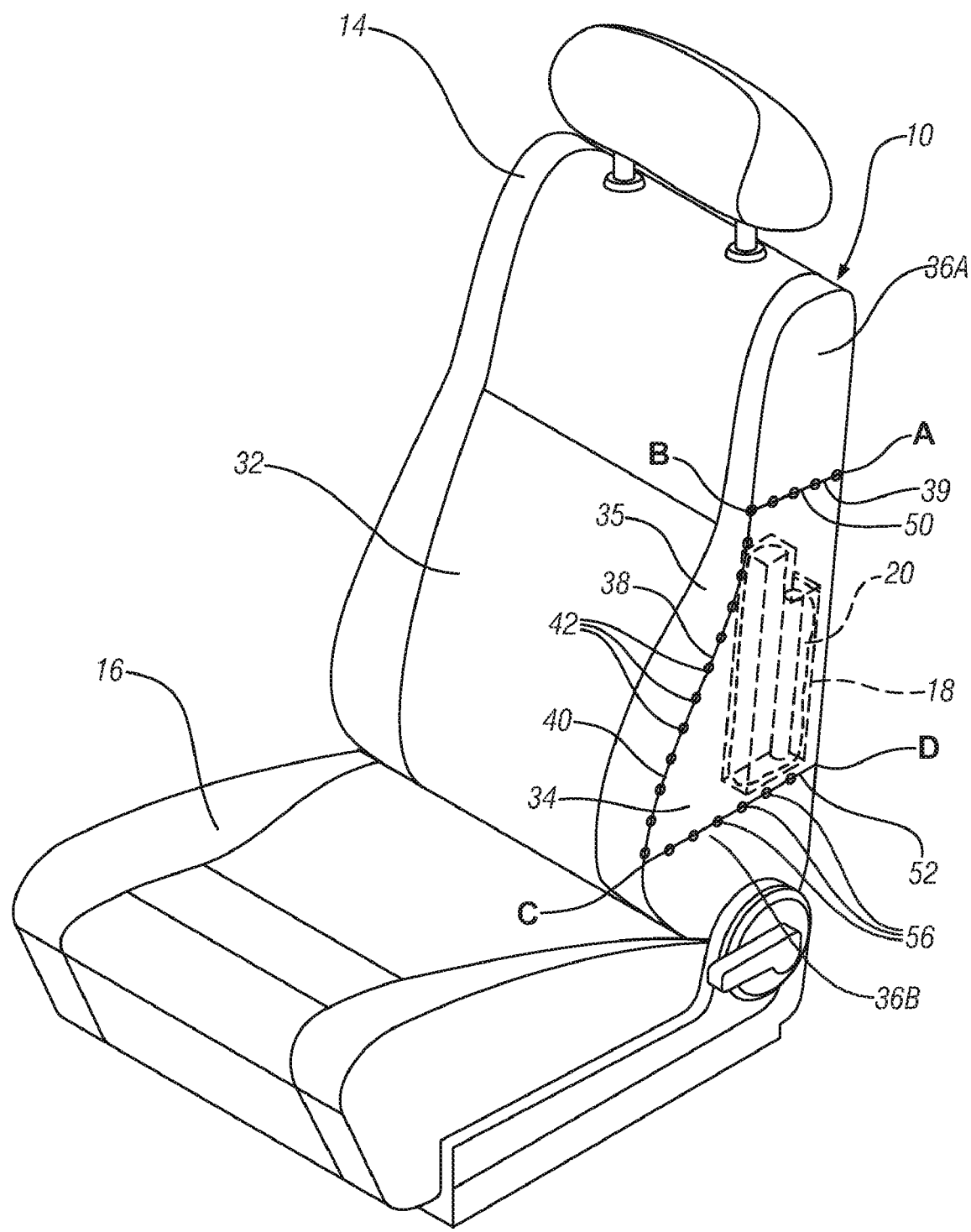
FIG. 16 shows another embodiment of the invention wherein the vertical extending separable seam section is on the forward edge of the seat back cover.

In addition, the configuration of the seat panels may be different with additional pieces forming each panel. For instance, FIG. 16 shows that the inset panel 34 could be extended forward to the forward edge of the side of the seat back 14, and the side panel 36 could be made of separate upper (36A) and lower (36B) pieces, which would be sewn to the front side panel 35 of the trim cover 32. In this manner the separable seam section 40 is seen as being located at the edge between the front seat back surface and the side seat back surface.

Figure 17:
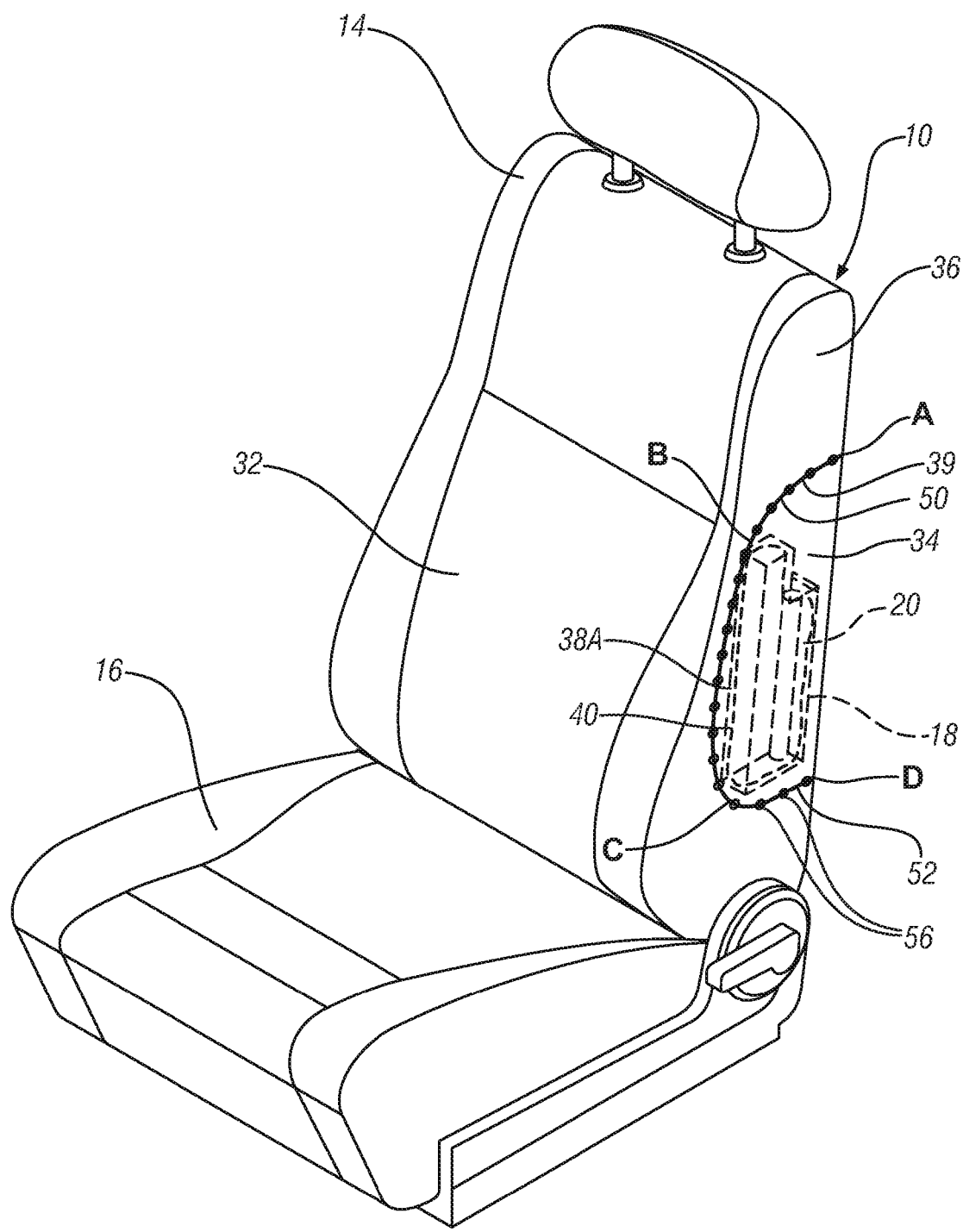
FIG. 17 shows another embodiment of the invention wherein the inset panel has curved edges instead of straight edges.

It will also be understood that the invention is not limited to having straight edges on the inset panel, or to having sharp angles at points B and C as was shown in FIG. 1. In FIG. 17, the edges A to B, B to C, and C to D are continuous curves, and points B and C are then points on the curves. Thus, while the C-shaped seam 38 of FIG. 1 was a block style C with straight edges and sharp corners, the C-shaped seam 38A of FIG. 17 is a rounded style C with curved edges and curved corners.

What is claimed is:

1. A method for sewing a seat cover including a front panel, a side panel and an inset panel to provide a continuous C-shaped separable seam for air bag deployment, comprising sewing the side panel and the inset panel together with a continuous separable seam, with vertical and upper and lower horizontal extending sections, that will break upon the air bag deployment to allow inflation of the air bag, and further comprising an inner chute sewn to the seat cover in proximity of the vertical tear seam and at least one of the horizontal tear seams to guide the deploying air bag to the continuous separable seam, said inner chute being made of a material that is less stretchable than the material of the seat cover and offering a smooth low friction surface to allow the low friction passage of the air bag against a foam cushion.

2. The method of claim 1 further comprising an outer chute to guide the deploying air bag to the continuous separable seam, said outer chute being made of a material that is less stretchable than the material of the trim cover and offering a smooth low friction surface to allow the low friction passage of the air bag against the seat cover.

3. The method of claim 1 further comprising prior to the sewing together of the side panel and the inset panel, sewing together the side panel and the inner chute with permanent vertical and upper and lower horizontal extending seams that will not break during air bag deployment.

4. The method of claim 2 further comprising prior to the sewing together of the side panel and the inset panel, sewing together the inset panel and the outer chute with permanent vertical and upper and lower horizontal extending seams that will not break during air bag deployment.

5. The method of claim 1 further comprising the separable vertical and upper and lower horizontal extending seam being formed of a continuous thread.

6. The method of claim 1 further comprising the separable seam being sewn entirely on the side surface of the seat back with both a side panel and an inset panel to locate the vertical separable seam portion away from the edge formed between the front panel and the side panel.

7. The method of claim 1 further comprising the vertical separable seam portion being sewn at the edge of the seat cover between the front panel and the side panel.

8. The method of claim 1 further comprising the side panel being formed of upper and lower pieces separately sewn to the front panel above and below the location of the inset panel.

9. A method for sewing a seat cover to provide a side panel and an inset panel with an C-shaped separable seam and an inner chute for air bag deployment that attaches in proximity to the vertical portion of the tear sear and also in proximity of at least one horizontal portion comprising:
    sewing the side panel and the inner chute together with permanent vertical and upper and lower horizontal extending seams that will not break during air bag deployment;
    and then sewing the side panel and the inset panel together with separable vertical and upper and lower horizontal extending seams that will break upon the air bag deployment to allow inflation of the air bag while the inner chute remains attached to the side panel to guide the deployment of the inflating air bag.

10. The method of claim 9 further comprising an outer chute for air bag deployment, and, prior to the sewing of the side panel and the inset panel together with the separable vertical and upper and lower horizontal seams, sewing the inset panel and the outer chute together with permanent vertical extending seams and upper and lower horizontal extending seams that will not break during air bag deployment.

11. The method of claim 9 further comprising the separable seam being located on the side of the seat between the side panel and the inset panel.

12. The method of claim 9 further comprising the seat cover including a front panel and the side panel being formed of an upper panel and a lower panel separately sewn to the front panel above and below the location of the inset panel, to locate the vertical separable seam portion on the edge formed between the front panel and the side panel.

13. The method of claim 9 further comprising the separable vertical and upper and lower horizontal extending seams being formed of a continuous thread.

14. A method for sewing a seat cover to provide a front panel and a side panel and an inset panel with a C-shaped separable seam and inner and outer chutes for air bag deployment comprising:
    sewing the side panel and the inner chute together with permanent vertical extending and upper and lower horizontal extending seams that will not break during air bag deployment where they are attached at locations near the proximity of the vertical tear seam portion and at least one of the horizontal tear seam portions;
    sewing the inset panel and the outer chute together with permanent vertical extending seams and upper and lower horizontal extending seams that will not break during air bag deployment;
    and then sewing the front panel and the side panel together with separable vertical extending seams and upper and lower horizontal extending seams that will break upon the air bag deployment to allow inflation of the air bag while the inner chute remains attached to the front panel and the outer chute remains attached to the side panel to guide the deployment of the inflating air bag.

15. The method of claim 14 further comprising the separable vertical and upper and lower horizontal extending seams being formed of a continuous thread.

16. The method of claim 1 further comprising the edges of the inset panel being straight, with sharp angles formed at the intersections of the edges.

17. The method of claim 1 further comprising the edges of the inset panel being curved, without angles formed at the intersections of the edges.

18. The method of claim 1 further comprising the edges of the inset panel being formed of a continuous curve, without intersections or angles.

19. The method of claim 1 further comprising the inner chute being sewn to the seat cover in proximity to the upper horizontal, vertical, and lower horizontal tear seam portions.

20. The method of claim 2 further comprising the outer chute being sewn to the inset panel in proximity to the vertical tear seam and at least one of the horizontal tear seam portions.

* * * * *